(12) United States Patent
Saluja et al.

(10) Patent No.: US 12,707,294 B2
(45) Date of Patent: Aug. 11, 2026

(54) BASE STATION NODE MONITORING AND REBOOTING

(71) Applicant: T-MOBILE INNOVATIONS LLC, Overland Park, KS (US)

(72) Inventors: Aditi Saluja, Bellevue, WA (US); George Cristian Apatachioae, Portland, OR (US); Vikas Ranjan, Bellevue, WA (US); Michael Valentino, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 217 days.

(21) Appl. No.: 18/416,610

(22) Filed: Jan. 18, 2024

(65) Prior Publication Data

US 2024/0244458 A1 Jul. 18, 2024

Related U.S. Application Data

(63) Continuation of application No. 17/646,106, filed on Dec. 27, 2021, now Pat. No. 11,917,432.

(51) Int. Cl.

| | |
|---|---|
| ***H04W 24/04*** | (2009.01) |
| ***H04L 41/0659*** | (2022.01) |
| ***H04L 41/16*** | (2022.01) |
| ***H04L 41/22*** | (2022.01) |

(52) U.S. Cl.
CPC ......... *H04W 24/04* (2013.01); *H04L 41/0661* (2023.05); *H04L 41/16* (2013.01); *H04L 41/22* (2013.01)

(58) Field of Classification Search
CPC .... H04W 24/04; H04L 41/0661; H04L 41/16; H04L 41/22
See application file for complete search history.

(56) References Cited

U.S. PATENT DOCUMENTS

| | | | | |
|---|---|---|---|---|
| 9,888,397 | B1 | 2/2018 | Puranik et al. | |
| 10,069,684 | B2 * | 9/2018 | Kant | H04L 41/145 |
| 10,397,043 | B2 * | 8/2019 | Tapia | H04L 41/5074 |
| 10,742,482 | B2 | 8/2020 | Tellado et al. | |
| 12,047,260 | B2 * | 7/2024 | Chandra | H04L 41/0686 |
| 2017/0325107 | A1 | 11/2017 | Prochniak et al. | |
| 2021/0359925 | A1 | 11/2021 | Bder et al. | |
| 2023/0100203 | A1 | 3/2023 | Fontanetta et al. | |
| 2023/0164596 | A1 | 5/2023 | Singh et al. | |

* cited by examiner

*Primary Examiner* — Chandrahas B Patel
(74) *Attorney, Agent, or Firm* — Shook Hardy & Bacon L.L.P.

(57) ABSTRACT

Embodiments for monitoring and rebooting a node of a wireless communications network are provided. Embodiments may include acquiring an incident indication for the node, the incident indication being indicative of a performance drop associated with a communication service provided by the node. Additionally, the incident indication may be analyzed to identify at least one key term or to identify a drop throughput that is comparable to historical incident indications. In some embodiments, the incident indication may include an indication that a reset of the node failed to improve the performance drop. In some embodiments, one or more of the historical incident indications may include an indication that a reset of the node failed to improve the performance drop. Further, a recommendation can be provided based on the incident indication and, in some embodiments, a resolution may be received based on providing the recommendation.

20 Claims, 6 Drawing Sheets

BASE STATION NODE MONITORING AND REBOOTING

CROSS-REFERENCE TO RELATED APPLICATIONS

This application is a continuation of and claims priority to U.S. application Ser. No. 17/646,106; filed Dec. 27, 2021; and titled "BASE STATION NODE MONITORING AND REBOOTING." The entirety of which is incorporated herein by reference.

SUMMARY

The present disclosure is directed, in part, to monitoring and rebooting base station nodes based to maintain performance of the base station node. The present disclosure utilizes specific hardware and software to improve existing trouble ticket systems for wireless communications networks. Work that is performed by base stations on the network is logged in different ways, such as in a trouble ticket or a work order. Site performance is monitored for a drop in performance, such as number of dropped calls, access failure rate, or an interference spike. If a drop in performance is detected, a site reset or other remedial action may be taken to attempt to improve the performance. Following the reset, the performance is again monitored to determine if the remedial action solved the drop in performance.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
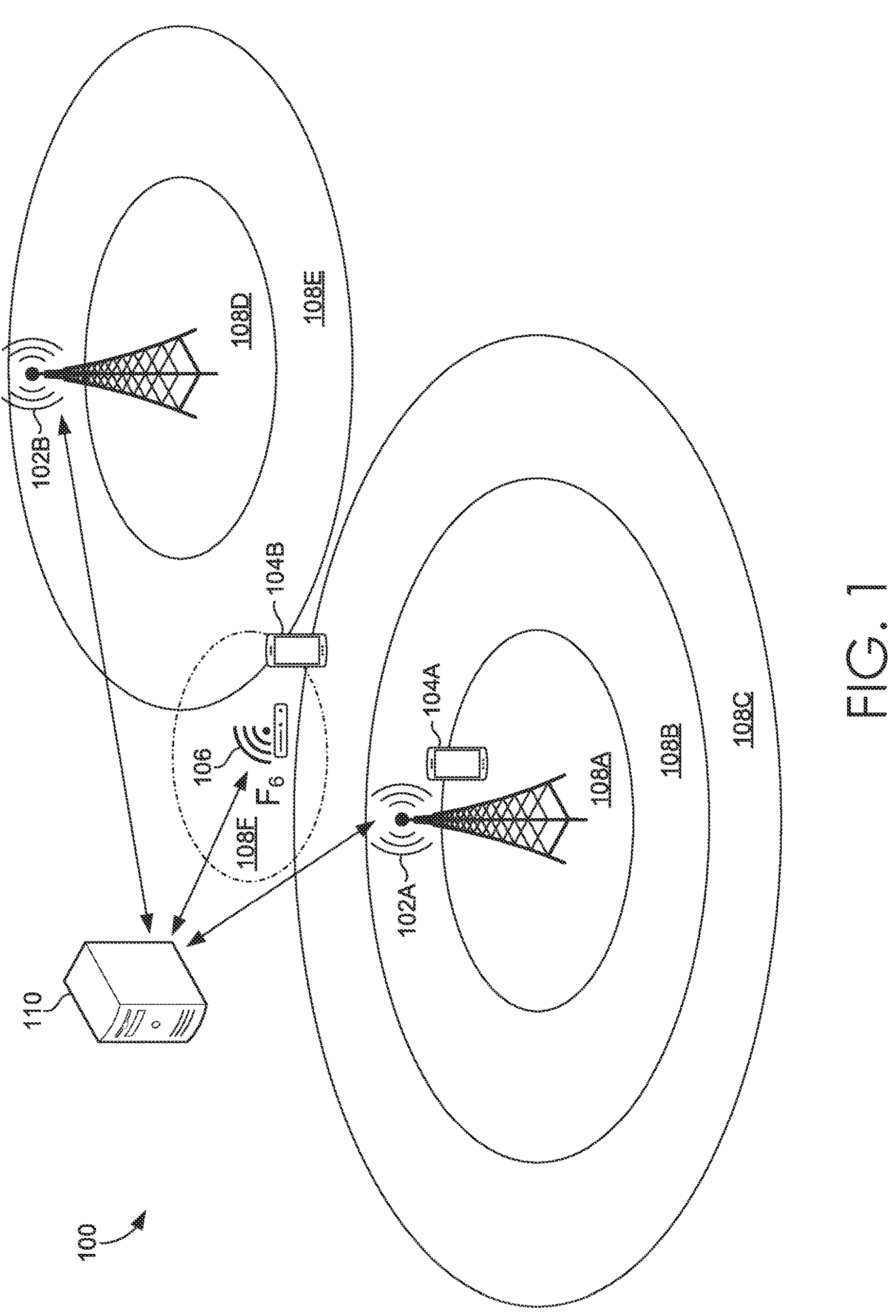
FIG. 1 is a diagram of a wireless communications network in which one or more aspects of the present disclosure may be carried out.

The subject matter of aspects herein is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 31st Edition (2018).

Embodiments of the current disclosure may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, are used to transmit and receive wireless signals to/from one or more UEs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, a node may be defined by its ability to communicate with a UE according to a single protocol (e.g., 3G, 4G, LTE, 5G, and the like); however, in other aspects, a single node may communicate with a UE according to multiple protocols.

As used herein, the terms "cell" or "node" may be specific nodes, base stations, or access points that can be considered to be discrete from one another. While cells and nodes may be referred to herein with respect to its protocol, it should be understood that any particular cell or node may be capable of operating in any one or more of any suitable wireless communication protocol, using any one or more frequencies, frequency bands, channels, and the like. The terms "user device," "user equipment," "UE," "mobile device," "mobile handset," and "mobile transmitting element" may be used interchangeably in this description.

Accordingly, a first aspect of the present disclosure is directed to a system that includes a processor and a non-transitory computer readable storage medium. The computer readable storage medium has a computer program thereon that, when executed by the processor performs a method. The method includes acquiring an incident indication for a node site indicative of a performance drop. The method further includes analyzing the incident indication to identify at least one key term. The method further includes accessing a set of prior incidents having a prior incident indication including the key term. The method further includes providing a recommendation to a user device based at least in part on the prior incident indication that includes a site reset for the node site. The method further includes acquiring a resolution indication following the site reset. The method further includes logging the resolution indication as a prior incident indication in the set of prior incidents.

A second aspect of the present disclosure is directed to a computerized method for site resetting. The method includes acquiring an incident indication for a node site indicative of a performance drop. The method further includes analyzing the incident indication to identify at least one key term. The method further includes accessing a set of prior incidents having a prior incident indication including the key term. The method further includes providing a recommendation to a user device based at least in part on the prior incident indication that includes a site reset for the node site. The method further includes acquiring a resolution indication following the site reset. The method further includes logging the resolution indication as a prior incident indication in the set of prior incidents.

A third aspect of the present disclosure is directed to a system comprising an administrative user device and a node. The administrative user device is configured to monitor performance of the node. The administrative user device is further configured to acquire an incident indication for the node indicative of a performance drop; analyze the incident indication to identify at least one key term; access a set of prior incidents having a prior incident indication including the key term; provide a recommendation to a user device based at least in part on the prior incident indication that includes a site reset for the node site; acquire a resolution indication following the site reset; and log the resolution indication as a prior incident indication in the set of prior incidents.

According to another aspect of the technology described herein, a system may include a base station and a user device in communication with the base station. The base station and the user device may each perform one or more of the steps described herein. According to yet another aspect of the technology described herein, a non-transitory computer readable storage medium having a computer program stored thereon. When executed by one or more processors, the computer program instructs the one or more processors to perform one or more of the steps described herein.

Referring to FIG. 1, a diagram of a wireless communications network 100 in which one or more aspects of the present disclosure may be carried out is depicted. The diagram may illustrate one or more features and an example environment for embodiments of the present disclosure. Wireless communications network 100 is shown as having a number of components and associated devices therein. The wireless communications network 100 includes base stations 102 (shown as 102A and 102B in FIG. 1). Base station 102 communicates with one or more UEs 104 (shown as 104A and 104B in FIG. 1) that are disposed within a coverage range of the base station 102. The wireless communications network 100 may also include one or more distributed stations 106 that may be partially or fully within the coverage area of the base station 102. The base stations 102 and/or distributed stations 106 each projects one or more frequency regions 108 (shown as 108A-C associated with base station 102A, 108D-E associated with base station 102B, and 108F associated with the distributed station 106 in FIG. 1) that include at least a portion of a band including one or more frequencies that the UE 104 may use to communicate with the base station 102.

An administrative user device 110 may be communicatively coupled to the base stations 102 and/or distributed stations 106. The administrative user device 110 may monitor the performance of the base stations 102 and/or the distributed stations 106 directly or indirectly. In some embodiments, the base station 102 and/or distributed stations 106 may report their performance. In other embodiments, the performance may be independently monitored by the administrative user device 110. In still other embodiments, the performance may be monitored by another computer device and/or sensor.

Wireless communications network 100 may be a 5G network, a 4G network, or other telecommunications network. The wireless communications network 100 facilitates communication between the UEs 104 and an external computing device, via the base station 102 and/or the distributed stations 106. The wireless communications network 100 may facilitate phone calls, text messages, Internet access, and/or other communications.

The base station 102 and/or distributed station 106 may assist the UE 104 in accessing the wireless communications network 100. This connection to the wireless communications network 100 may be described in the ETSI 125-136 series and/or the 3GPP 25/36 series specifications. The base station 102 and/or distributed station 106 may assist the UE 104 by providing network-selection assistance data to the UE 104. The network-selection assistance data is indicative of a recommended frequency or frequencies that the base station 102 recommends for the UE 104.

The UE 104 may also be referred to as a user device, a cell phone, a smart phone, or the like. The term "user equipment" or "UE" may be described in the Universal Mobile Telecommunications System (UTMS) and/or the 3GPP Long Term Evolution (LTE) as any electronic device utilized directly by an end-user to communicate. Examples include a hand-help smart phone, a traditional cellular phone, a laptop computer equipped with a mobile broadband router (external or internal), a tablet computer with a mobile broadband router, etc. In some embodiments, the UE utilized in certain methods may be a modern 5G-enabled smartphone.

Distributed stations 106 may cover a relatively small geographic area with the distributed frequency region 110, compared with the frequency regions 108 of the base station 102. The distributed station 106 may be unaffiliated with the base station 102 and/or may be temporary. The distributed station 106 may also be referred to as an "unplanned cell," a "femtocell", a "pico cell," a "micro cell," a "metro cell," a "small cell," a "fixed relay," or the like. For example, a femtocell may be disposed in a home or business and provide coverage for up to 32 users in a range of up to 100 meters. As another example, a pico cell may be disposed in a large shopping mall or airport and provide coverage for up to 128 users in a range of up to meters. As yet another example, a micro cell may be disposed in a large urban area to fill coverage gaps between base stations 102 and provide coverage for up to 256 users in a range of up to 1000 meters.

Especially with the implementation of 5G, unplanned and irregular placements of access nodes (including the base station 102 and the distributed stations 106) may become more common due to the impassability and limited range of the high-frequency signals. For example, the distributed stations 106 may be placed in common public areas such as restaurants and shopping malls to supplement weaker signals from a base station 102. This arrangement of base stations 102 and distributed stations 106 may be referred to as a heterogeneous network environment. Thus, aspects assist the user device in identifying and connecting to these distributed stations 106 in a heterogeneous network environment.

Frequency regions 108 are geographic areas covered by at least a portion of a certain frequency band. For example, frequency region 108A may be covered by a first band, frequency region 108B may be covered by a second band, distributed frequency region 108F may be covered by a third band, etc. While in FIG. 1 these frequency regions 108 are shown as ovals, in reality the frequency regions 108 often have an irregular shape due to the terrain, buildings, and other physical features in the geographic location. The frequency regions 108 are also not constant in size and shape and can change due to changing conditions such as weather, interference, and other equipment. Specifically, higher frequency 5G signals are less likely to penetrate solid objects such as walls and trees at least in part because of the nature of high-frequency electromagnetic waves.

An example embodiment of the present disclosure shown in FIG. 1 will now be discussed. In this example, the administrative user device 110 is monitoring the performance of the base station(s) 102 and/or the distributed station(s) 106. If a drop in performance is detected, the administrative user device may determine a recommendation, a remedial action, a reporting message, or other remedial action. The administrative user device may determine that the remedial action should be delayed until a less traffic-intensive time period. Upon the remedial action being taken (such as by the administrative user device 110, by the base station 102, by the distributed station 106, by a human administrator, or some combination thereof), the performance may be monitored to determine if the remedial action taken adequately addressed the drop in performance.

Figure 4:
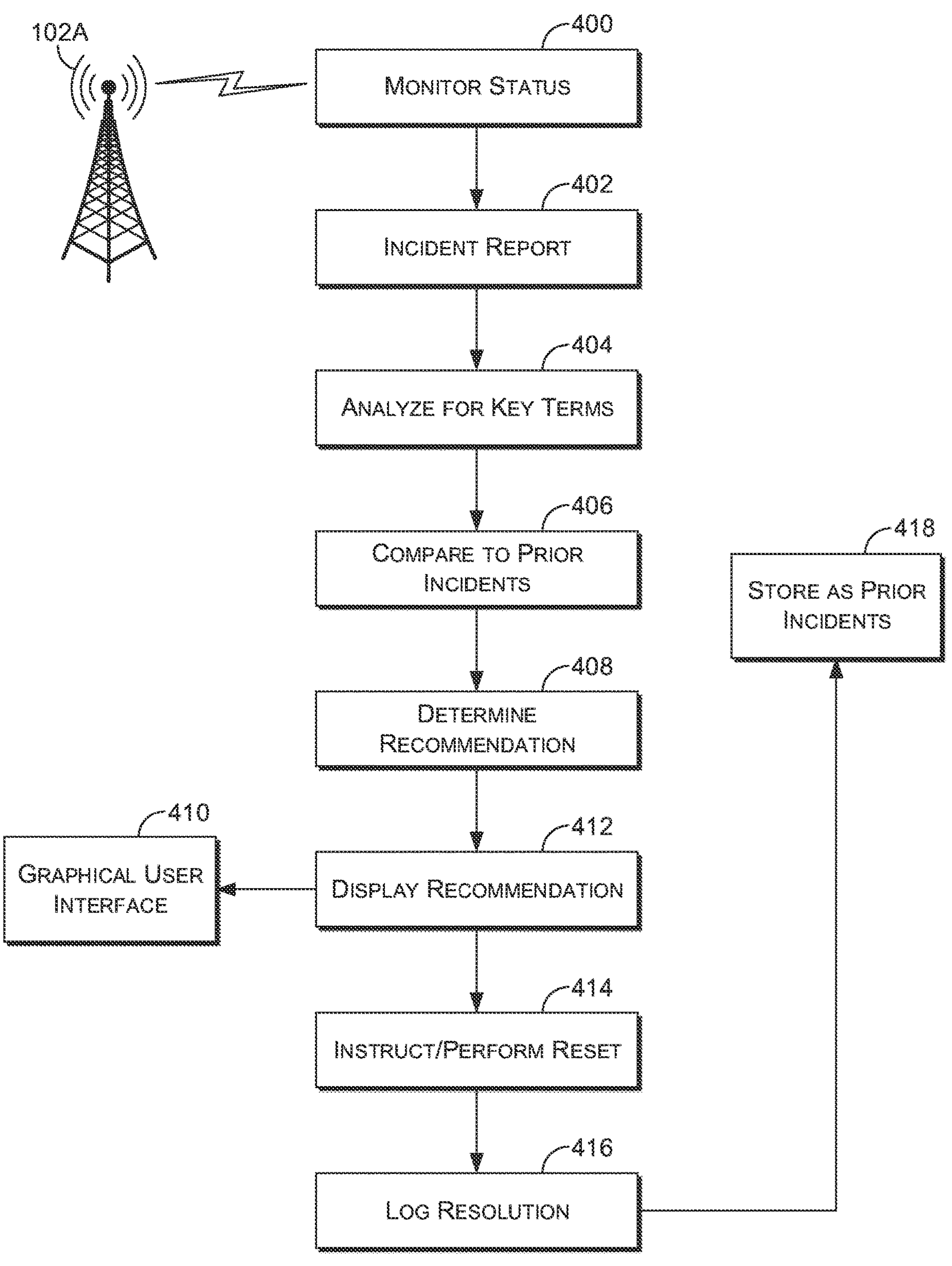
FIG. 4 is a flow diagram of one aspect of a method of monitoring and maintaining performance across a wireless communications network.

An example embodiment of aspects herein used in an Open Radio Access Network (RAN) architecture is shown and described. Previous RAN architectures (such as 2G, 3G and 4G; an example of which is shown in FIG. 4) are at least partially monolithic, having few interactions happened between logical nodes. However, the New Radio (NR) may divide the gNB (the NR logical node) between Central Units (CUs) and Distributed Units (DUs) for increased flexibility. Flexible hardware and software implementations allow scalable, cost-effective network deployments—but only if hardware and software components are interoperable and can be mixed and matched from different vendors. A split architecture (between central and distributed units) allows for coordination for performance features, load management, real-time performance optimization and enables adaptation to various use cases and the quality of service (QoS) that needs to be supported (i.e. gaming, voice, video), which have variable latency tolerance and dependency on transport and different deployment scenarios, like rural or urban. Mobile operators may deploy a functional split architecture that openly interfaces between RU, DU and CU in some combination.

The radio unit (RU) at least partially controls the digital front end (DFE) and the parts of the physical (PHY) layer, as well as the digital beamforming functionality. The distributed unit (DU) is in close physical proximity to the RU. The UEs communicated with the DU through the RU. The DU at least partially may control the radio link control (RLC), the medium access layer (MAC), and parts of the PHY layer. This logical node includes a subset of the eNB/gNB functions, depending on the functional split option, and its operation is controlled by the CU. The centralized unit (CU) at least partially controls the Radio Resource Control (RRC) and Packet Data Convergence Control (PDCP) layers. The gNB may consist of a CU and a DU connected to the CU via Fs-C and Fs-U interfaces for CP and UP respectively. A CU with multiple DUs will support multiple gNBs. The split architecture enables a 5G network to utilize different distribution of protocol stacks between CU and DUs depending on midhaul availability and network design. It is a logical node that includes the gNB functions like transfer of user data, mobility control, RAN sharing (MORAN), positioning, session management etc., with the exception of functions that are allocated exclusively to the DU. The CU controls the operation of several DUs over the midhaul interface.

Returning to FIG. 2, an example embodiment in an Open RAN environment is shown. The Open RAN environment includes a centralized unit (CU) communicatively coupled with a distributed unit (DU). The DU as illustrated is associated with a radio unit (RU). The DU communicates with user equipment (UE), labeled as UE1 and UE2, via the RU.

In aspects, the DU sends messages to and receives messages from the UEs. As an example, the DU may send one of the UEs a compute status and/or network status message, indicative of a current status of the DU and/or the Open RAN network generally. The compute capability status message may be sent in response to the compute status message from the DU. As a third example, the UE may send a compute resource report to the DU. The compute resource report may be indicative of processing power and other attributes of the UE regardless of the current capability and/or status.

Figure 2:
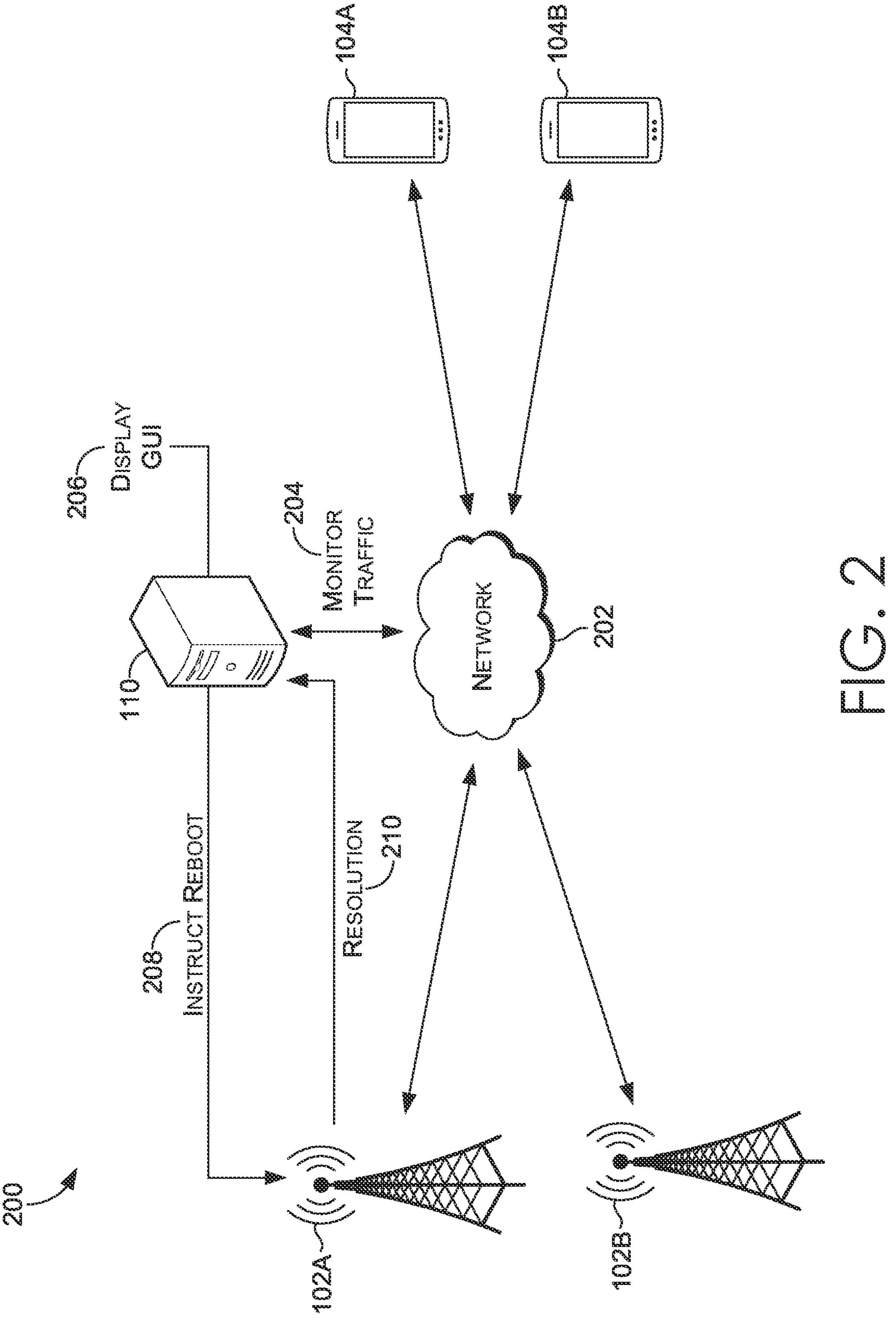
FIG. 2 is a graphical representation of network in which one or more aspects of the present disclosure may be carried out.

FIG. 2 shows a network monitoring system 200 of an example embodiment of the present disclosure. Shown in FIG. 2, the system 200 includes the administrative user device 110, a first node 102A, and a second node 102B. The nodes 102A and 102B communicate over a wireless communications network 202 with a first UE 104A and a second UE 104B. In some embodiments, the wireless communications network 202 and/or the UEs 104 may be considered components of the network monitoring system.

Figure 3:
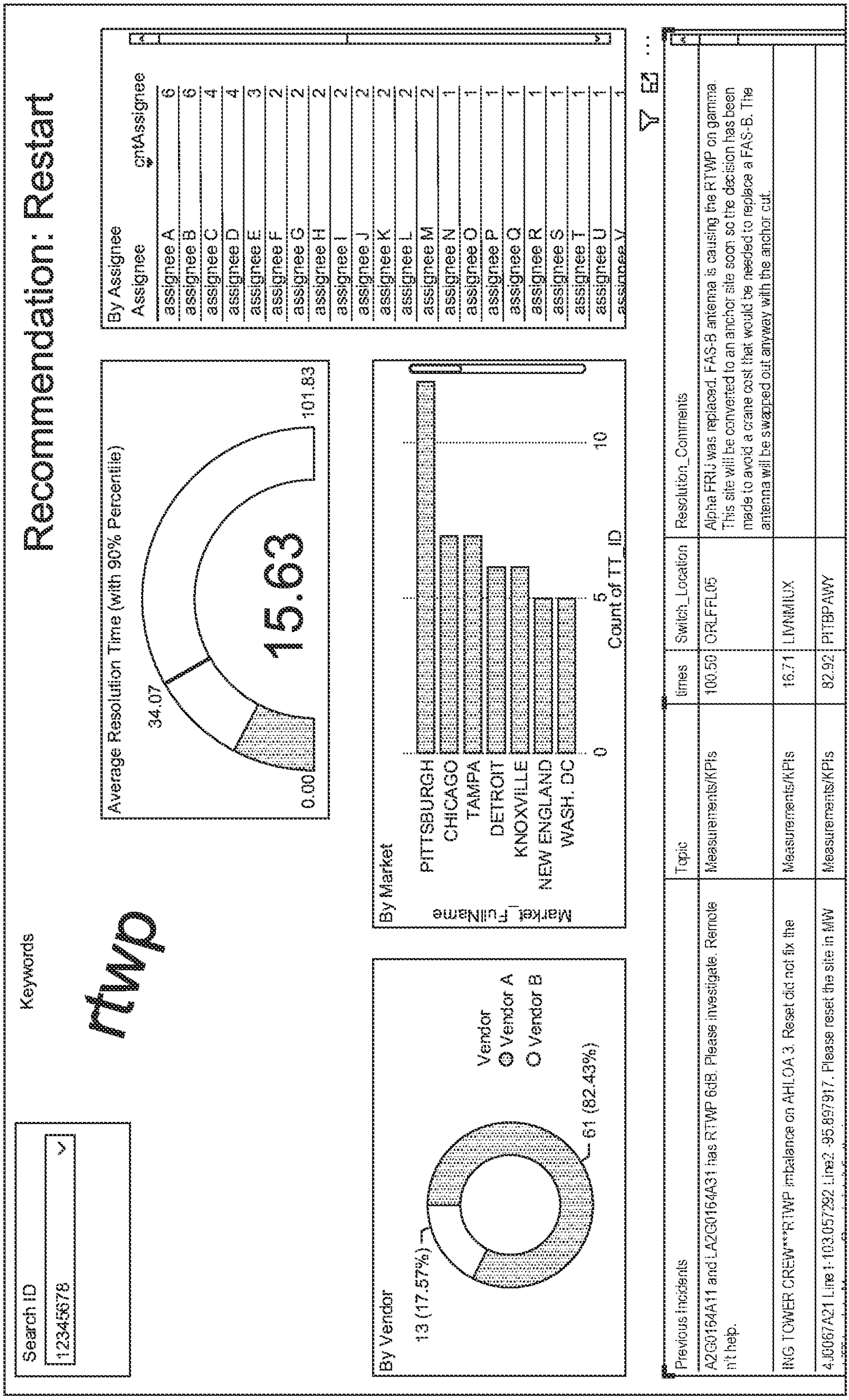
FIG. 3 is a graphical user interface of a recommendation in which one or more aspects of the present disclosure may be carried out.

FIG. 2 shows the administrative user device 110 conducting steps including monitoring traffic 204 over the network. Based upon the monitoring, a drop in performance may be detected and analyzed. Based upon the analysis a recommendation may be generated and displayed on a graphical user interface (GUI) 206, such as shown in FIG. 3. Based upon the displayed recommendation, the administrative user device 110 may receive user input to instruct a reboot 208 or take other remedial action. Based upon the reboot, a resolution may be monitored 210 to determine whether the reboot addressed the drop in performance. If the drop in performance in not addressed, e.g., because the drop in performance persists after the reboot, the administrative user device 110 may provide an updated recommendation or take other remedial actions.

FIG. 3 shows an example graphical user interface (GUI) of a recommendation. It should be appreciated that the example of FIG. 3 shows various elements that may be presented by the GUI, but other embodiments of the current disclosure may show more or less elements, and the elements may be arranged differently, combined, separated, or other variation. FIG. 3 shows distinct visual boxes that each contain distinct information. As illustrated, the boxes may contain numerical information, graphical information, or the like so as to provide the administrator with visual information to confirm and execute the recommended remedial action.

As a first example, the GUI of a recommendation may include a Search ID box. The Search ID box may include an incident identification number. The incident identification number may have been assigned by the administrative user device, by the node, or by another computing device.

As a second example, the GUI of the recommendation may include a Keywords box. The keywords box may identify one or more keywords from the incident report that are indicative of the recommendation and/or remedial actions. The keywords may have been identified via a machine learning algorithm to determine which, if any, terms from the incident report have the most impact on remedial actions or other recommendations.

As a third example, the GUI of the recommendation may include an Average Resolution Time box. The average resolution time box may give the administrator information related to the complexity of the situation, and/or a time goal for dealing with the situation. The average resolution time may be based upon comparisons to prior incidents that were resolved in a certain amount of time. The average resolution time box may also include a timer to track the time spent by the administrator in resolving the issue.

As a fourth example, the GUI of the recommendation may include a By Assignee box. As a fifth example, the GUI of the recommendation may include a By Vendor Box. As a sixth example, the GUI of the recommendation may include a By Market box. The By Assignee, By Vendor, and/or By Market boxes may provide the administrator with information related to who and where similar drops in performance have been identified. These boxes may provide information from the assembled prior incidents. The information may provide the administrator with information for identifying patterns in the prior incidents, points of contact for dealing with the incident, etc. For example, the By Market box in FIG. 3 shows that the incident type is common in the Pittsburgh market. If the administrator is in Pittsburgh, this may be indicative of a systemic problem with the nodes within that market. If the administrator is not in Pittsburgh, the administrator may contact peer administrators in Pittsburgh for more information on the problem and possible solutions.

As a seventh example, the GUI of the recommendation may include a Previous Incidents box. The Previous Incidents box provides detailed information from the identified prior incidents. This may provide the administrator with more detailed information as to the identified prior incidents, if needed by the administrator.

At the top of the GUI of the recommendation may include the overall recommended remedial action (as shown in FIG. 3, "Recommendation: Restart"). The overall recommended remedial action is that which is calculated to correct the detected reduction in performance. Other possible remedial actions may include no action, a delayed restart (such as to a later time during a lesser call load), a soft restart, a software upgrade, a hardware upgrade, or the like.

FIG. 4 depicts a flow diagram of an exemplary method for monitoring and rebooting equipment across a communications network. Steps of the method may be performed by the UE, by a base station, by a distributed station, or by some combination thereof. The steps may also be performed in any order. Two or more steps may be performed simultaneously.

At step 400, a processor (such as in the administrative user device 110) monitors the performance of the node 102 directly or indirectly. The monitoring is of a mobile communications network, such as mobile communications network 100 of FIG. 1. Information related to the connection speeds and/or connection drops on the node 102 may be sent to the administrative user device (or may be directly monitored by the administrative user device).

At Step 402, the processor identifies an incident report. In some embodiments, the processor receives the incident report from an external computing device, such as the node 102. In other embodiments, the processor generates the incident report.

In embodiments, an incident report is an alarm that communicates the identification of the node in which out-side-of-normal throughput rates outside of normal performance were detected. The normal rate may be determined by measuring the message throughput during that time period. In one aspect, the total data transfer through an individual node for a time period may be determined by retrieving a count of total bytes transferred through the node at $T_0$ and $T_1$, where $T_0$ is the beginning of the time period and $T_1$ is the end of the time period. The total bytes at $T_0$ can be subtracted from the total at $T_1$ to calculate the total bytes transferred during the time period. The rate can be calculated by dividing the total bytes transferred during the period by the amount of time that passed between $T_0$ and $T_1$.

The normal range should take into account the role of the individual node that is being analyzed. Different nodes may play different roles, especially within a load-balancing regime. If the load-balancing regime attempts to evenly distribute message communication duties between the nodes, then the performance of each should be similar. On the other hand, if some nodes have preference within the load-balancing algorithm, then the preferences need to be considered when determining the normal range for each node. The normal range may differ for nodes associated with a UE, geographic area, or adjacent nodes. A different normal performance may be calculated for each similarly situated group of nodes.

Once a normal performance is determined for a particular node, the performance of that node is monitored and compared to the normal performance. When the performance of the node falls below (or in some instances, rises above) the normal performance, then an incident indication is initiated.

In one aspect, the normal performance is expressed as a range. In another aspect, the normal performance is expressed as an individual rate. If expressed as a range, any number inside the range may be normal, and a throughput rate for the node outside the range may be considered abnormal. However, an additional threshold may be added to the range to avoid false alarms. For example, the transfer rate may need to fall below the normal range for more than a threshold amount of time before an alarm is sounded or an upset event is initiated. Once the throughput rate falls below the threshold from the normal range, then the upset condition is generated. The threshold may be statistically derived as a standard deviation away from the normal condition, or two standard deviations or whatever is suitable for the particular node.

The data may be measured in bytes, messages, or some other unit of measure. Different ways of determining a normal data transfer rate are possible. These methods include taking an average rate based on observations of an individual node, taking an average rate from a group of similar nodes, and using a theoretical maximum transfer rate achievable by the node. For example, the normal message transfer rate could be 80% of the maximum theoretical transfer rate.

At Step 404, the processor analyzes the incident report for key terms. The key terms may be identified from the incident report, from the node 102, from note entries from an administrator, or from other sources. Key terms may be related to physical characteristics of the node, software characteristics of the node, characteristics of one or more UEs connected to the node (e.g., for UEs that had dropped calls), protocols being used, additional problems identified (e.g., in addition to the drop in throughput), and other information related to the hardware and/or software being used. The key terms are identified from the incident report such as by a natural language processing, machine learning, algorithmic, or other methods. The processor may determine terms that have been identified as key terms in prior incidents. The processor may additionally or alternatively may context-specific determinations regarding the key terms.

At Step 406, the processor compares the incident report to prior incidents, based at least in part on the identified key words. Once the key terms are identified, analogous prior incidents may be identified from a data store having prior incidents. The analogous prior incidents may have at least one common key term, a comparable drop in throughput, or other commonalities between the current incident report and the prior incidents.

In some embodiments, at least a portion of the prior incidents were generated by a human administrator, such as before embodiments of the present disclosure were implemented or by adjacent systems not utilizing embodiments of the present disclosure. The human-generated prior incident reports may include one or more key terms identified by the human administrator during that incident. In other embodiments, the key terms may be at least partially generated from a narrative written by the human administrator.

The key terms identified by the processor may be derived at least in part from a human administrator of a prior incident. In some instances a first portion is derived from a human administrator and a second portion is derived from a prior instance of the embodiment of the present disclosure. Over iterations of embodiments of the present disclosure, the reliance upon human-generated content will decrease as more prior incidents become computer-generated (as discussed below in relation so Step 418). The increase in computer-generated content over iterations will allow for more accurate analysis.

At Step 408, the processor determines a recommendation. The processor analyses those prior incidents that were identified as analogous in Step 406 to determine what, if any, remedial action was taken as well as what, if any, resolution was observed following that remedial action. If the processor identifies favorable resolutions, the processor may identify the remedial action taken as likely to produce a similarly favorable resolution. If the processor identifies non-favorable resolutions, the processor may identify the remedial action taken as unlikely to produce a favorable resolution. If the processor identifies a delayed remedial action, the processor may analyzes the performance during the delay to determine whether a delayed remedial action may be appropriate (based upon other factors, such as a current time of day, UE load, and the overlapping coverage areas).

At Step 410, the processor generates a graphical user interface. The graphical user interface may be shown on a display of the administrative user device. In some embodiments, the processor may generate a notification message and send (or instruct sending) of the notification message to the administrative user device, a mobile computing device of the administrator (such as a smart phone or smart watch) such that the administrator has immediate access to the recommendation, the incident report, or other information. The notification message may (automatically or upon being selected by the administrator) load the GUI.

At Step 412, the processor displays the recommendation on the graphical user interface. An example of the recommendation displayed is shown in FIG. 3. The recommendations provides a recommended remedial action for the administrator. In some embodiments, such as illustrated in FIG. 3, the recommendation provides information to the administrator such that the administrator may independently perform the remedial action. In other embodiments, the recommendation may include a user input for the user to select and accept the recommended remedial action, reject the recommended remedial action, or take other action.

At Step 414, the processor instructs and/or performs a reset or other remedial action. In some embodiments, the processor sends a message to the node instructing the reset or other remedial action, such as in response to the administrator confirming the proposed remedial action. In other embodiments, the processor performs the reset or other remedial action. In still other embodiments, the administrator may manually reset the node based upon seeing the proposed remedial action. For example, the administrator may temporarily cut power to the node in order to cause the reset.

In some embodiments, the processor instructs and/or performs the reset automatically and provides the recommendation to the administrative user device as a summary of the remedial action performed and the reasons thereof. In these embodiments, the remedial action may be taken without any human interaction.

At Step 416, the processor monitors and logs a resolution. The processor may monitor the performance of the reset node (or otherwise after the remedial action is performed). This remedial monitoring may be the same as the standard monitoring that the administrative user device performs for one or more nodes. In other embodiments, the remedial monitoring may be more detailed or intensive than standard monitoring. This may provide a more complete log of the performance following the remedial action.

At Step 418, the processor stores the log as a prior incident. The log may include the incident report, key terms identified, the recommended remedial action, the remedial action taken, and/or the logged resolution. By storing the log as a remedial action, the processor can access the log in the future, from the data store. The processor may cause a machine reading of the data store to identify information from the logged prior incident.

In embodiments, one or more of the above-discussed steps may be performed by the user device. In other embodiments, one or more of the above-discussed steps may be performed by the base station and one or more of the above-discussed steps may be performed by the user device. In still other embodiments, one or more of the above-mentioned steps may be performed by the distributed station. In yet still other embodiments, one or more of the above-discussed steps may be performed by the distributed station and one or more of the above-discussed steps may be performed by the user device.

Figure 5:
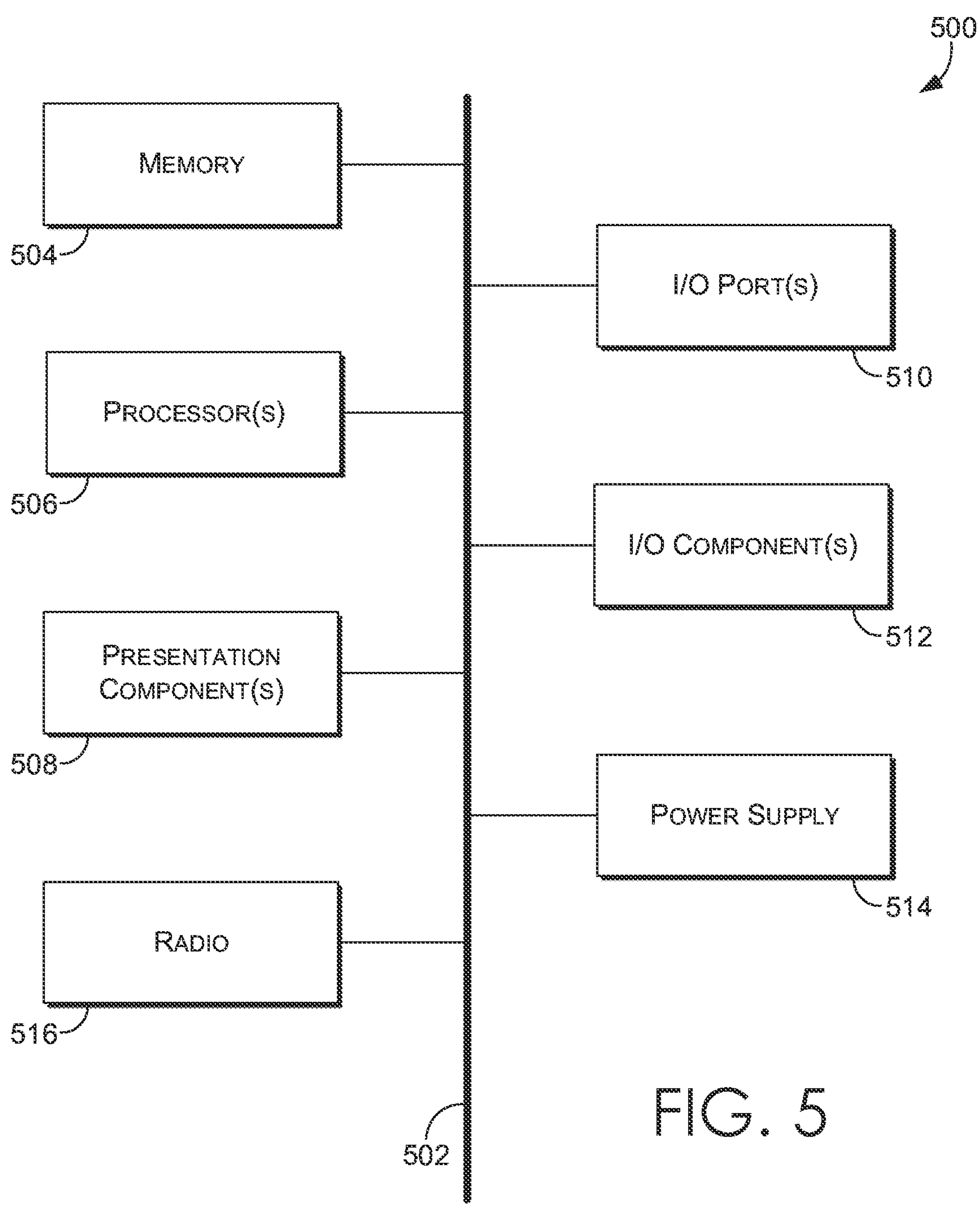
FIG. 5 is a diagram of a computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of aspects described herein. Neither should computing device 500 be interpreted as having any dependency or requirement relating to any one or combination of components illustrated. In aspects, the computing device 500 may be a UE 104, WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. In aspects, the radio 516 utilizes one or more transmitters, receivers, and antennas to communicate with the wireless telecommunications network on a first downlink/uplink channel. Though only one radio is depicted in FIG. 1, it is expressly conceived that the computing device 500 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects herein. Components such as a base station 102, a communications tower, or even access points (as well as other components) can provide wireless connectivity in some embodiments.

Figure 6:
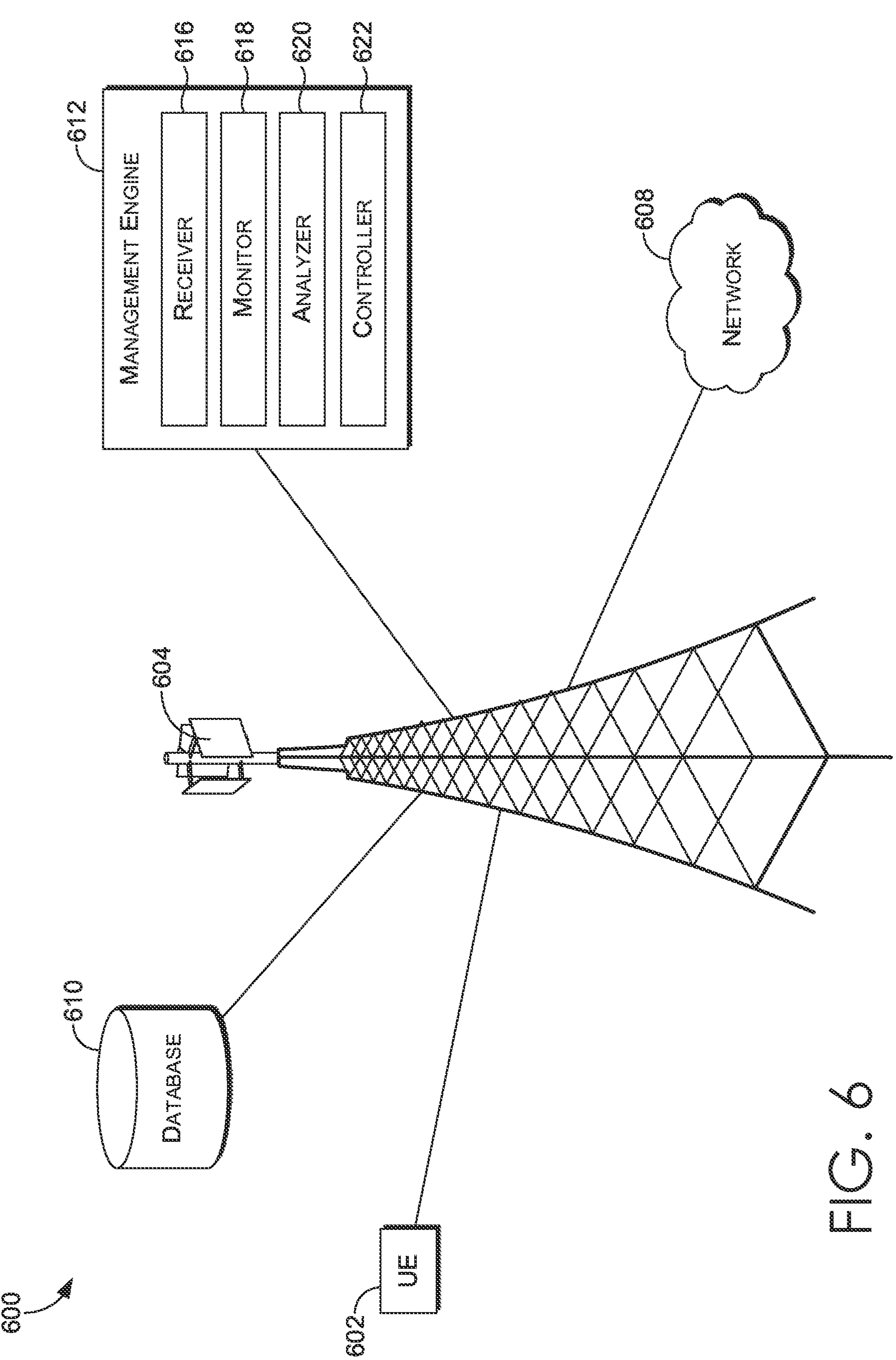
FIG. 6 illustrates a network environment in which implementations of the present disclosure may be employed.

FIG. 6 provides an exemplary network environment in which implementations of the present disclosure may be employed. Such a network environment is illustrated and designated generally as network environment 600. Network environment 600 is but one example of a suitable network environment and is not intended to suggest any limitation as to the scope of use or functionality of aspects. Neither should the network environment be interpreted as having any dependency or requirement relating to any one or combination of components illustrated.

Network environment 600 includes user device 602, a first node 604, network 608, database 610, and management engine 612. In network environment 600, the user device 602 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that wirelessly communicates via with a node of the wireless network, such as the first node 604, in order to interact with one or more components of the network 608.

In some aspects, the user device 602 can correspond to computing device 500 in FIG. 1. Thus, a user device can include, for example, a display(s), a power source(s) (e.g., a battery), a data store(s), a speaker(s), memory, a buffer(s), a radio(s) and the like. In some implementations, the user device 602 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 602 may communicate with the node 604 on any one or more frequencies, frequency bands, channels, or the like. Though only the node 604 is depicted in FIG. 2, it should be understood that the user device 602 may be capable of connecting to any one or more of a plurality of nodes, using any one or more of a plurality of communication protocols, on any one or more of a plurality of frequencies.

In some cases, the user device 602 in network environment 600 can optionally utilize network 608 to communicate with other computing devices (e.g., a mobile device(s), a server(s), a personal computer(s), etc.) through the node 604. The network 608 may be a telecommunications network(s), or a portion thereof. A telecommunications network might include an array of devices or components (e.g., one or more base stations 102), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 608 can include multiple networks, as well as being a network of networks, but is shown in more simple form so as to not obscure other aspects of the present disclosure.

Network 608 can be part of a telecommunication network that connects subscribers to their immediate service provider. In some instances, network 608 can be associated with a telecommunications provider that provides services (e.g., voice, data, SMS) to user devices, such as user device 602. For example, network 608 may provide voice, SMS, and/or data services to user devices or corresponding users that are registered or subscribed to utilize the services provided by a telecommunications provider. Network 608 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, the first node 604 is configured to communicate with user devices, such as the user device 602 that are located within the geographical area, or cell, covered by the one or more antennas of the first node 604. Though referred to as a node for simplicity, the first node 604 may include (or be communicatively coupled to) one or more base stations 102, distributed stations, nodes, base transmitter stations, radios, antennas, antenna arrays, power amplifiers, transmitters/receivers, digital signal processors, control electronics, GPS equipment, and the like. In particular, the node 604 may transmit a downlink signal to the user device 602 in an effort to establish a wireless communication session. The user device 602 may perform a cell selection/reselection procedure wherein the user device 602 makes various determinations, measurements, and/or observations about one or more network parameters. If the user device 602 selects (or reselects) the cell comprising node 604, the user device 602 may in return, attempt to communicate an uplink signal back to the node 604.

The first node 604 may be in communication with the management engine 612, which comprises various components that are utilized, in various implementations, to perform one or more methods as described herein. In some implementations, such as the one depicted in FIG. 6, the management engine 612 comprises components including a receiver 616, a monitor 618, a performance logging engine 620, and a controller 622. However, in other implementations, more or less components than those shown in FIG. 6 may be utilized to carry out aspects described herein. Though shown as a separate entity, the management engine 612 may take the form of one or more software stacks, modules, applications, etc., may be executed and/or located at a single location or a plurality of locations, and may executed by one or more network components, or may provide instructions for execution at a location remote to the management engine.

The receiver 616 of the management engine 612 is generally responsible for receiving information and/or indications from various network components and/or user devices that may be relevant for making uplink management decisions. For example, the receiver 616 may receive a plurality of RF signals in the uplink. Said received RF signals may comprise external interference, inter-modulation interference, inter-nodal interference, thermal noise, jamming RF, uplink transmissions from a user device, or the like. The receiver 616 may communicate said information to one or more of the monitor 618, the performance logging engine 620, or the controller 622. The monitor 618 of the management engine 612 is generally responsible for monitoring signal strength, transfer speeds, call connections, and other aspects of the received RF signals in the uplink and one or more network parameters of the wireless communication links between the node 604 and the user device 602.

The one or more network parameters may comprise a frequency, channel, frequency band, wireless communication protocol, selected cell, or the like. The monitor 618 may communicate said information to one or more of the performance logging engine 620 and the controller 622.

The performance logging engine 620 may receive an indication from the receiver 616 and/or the monitor 618 as to the current information related to current performance of the node, which may include transfer speeds, call drops, packet loss, and other analytics. The performance logging engine 620 may generate record one or more performance logs, which may include an incident report on a drop in performance. The receiver 616 may receive instruction to perform the remedial action and send such to the performance logging engine 620 and/or the controller 62. The controller 622 may implement or otherwise cause the remedial action, such that the remedial action (such as a reset) is performed. Thus, the efficiency of the overall system may be increased by remotely receiving and executing the reset instructions.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system comprising:

one or more processors; and one or more computer storage hardware devices storing computer-usable instructions that, when used by the one or more processors, cause the one or more processors to:

acquire an incident indication for a node providing access to a wireless communications network, the incident indication being indicative of a performance drop associated with a communication service provided by the node;

analyze the incident indication to identify at least one key term;

identify a prior incident indication, for the node, that includes the at least one key term and that includes an indication that a reset of the node failed to improve the performance drop; and based on the incident indication and identifying the prior incident indication, provide a recommendation to a user device.

2. The system of claim 1, wherein the at least one key term corresponds to one or more user devices having a dropped call while using the communication service provided by the node.

3. The system of claim 1, wherein the at least one key term corresponds to hardware and software associated with providing the communication service.

4. The system of claim 1, wherein the recommendation further includes an average amount of time for completing the recommendation, the average amount of time based on historical resolutions for prior incident indications.

5. The system of claim 1, wherein the recommendation further identifies a component of the node corresponding to the performance drop.

6. The system of claim 1, wherein the one or more processors are further caused to receive, in response to providing the recommendation to the user device, a resolution indication indicating that the performance drop has been corrected.

7. The system of claim 1, wherein the at least one key term is identified within the incident indication and the prior incident indication based on applying natural language processing.

8. The system of claim 1, wherein the indication that the reset of the node failed to improve the performance drop is identified within the prior incident indication based on applying machine learning.

9. A computerized method comprising:

acquiring an incident indication of a performance drop for one or more nodes that provide access to a communication network;

comparing the incident indication to a prior incident indication having a comparable drop throughput, the prior incident indication also having an indication that a reset of the one or more nodes failed to improve the performance drop;

based on comparing the incident indication to the prior incident indication, providing a recommendation; and receiving a resolution indication based on providing the recommendation.

10. The computerized method of claim 9, further comprising:

comparing the incident indication to a plurality of prior incident indications for a plurality of nodes having a drop throughput that corresponds to the drop throughput of the incident indication; and providing the recommendation based on comparing the incident indication to the plurality of prior incident indications.

11. The computerized method of claim 9, wherein drop throughput corresponds to a throughput rate that is below a threshold for a period of time, wherein the period of time for the prior incident indication is an earlier time period than the period of time for the incident indication.

12. The computerized method of claim 11, wherein the throughput rate for the incident indication is determined by measuring a total data transfer through a first node of the one or more nodes during the period of time, and wherein the throughput rate for the prior incident indication is determined by measuring a total data transfer through a second node of the one or more nodes during the period of time that is the earlier time period.

13. The computerized method of claim 9, wherein the reset of the one or more nodes was performed automatically.

14. The computerized method of claim 9, wherein the resolution indication indicates that the performance drop has been corrected based on the recommendation.

15. The computerized method of claim 9, wherein the incident indication corresponds to a first node and a second node of the one or more nodes and the prior incident indication corresponds to the second node of the one or more nodes.

16. One or more non-transitory computer storage media having computer-executable instructions embodied thereon, that when executed by one or more processors, cause the one or more processors to perform operations comprising:

acquiring an incident indication for a node providing access to a communication network, the incident indication being indicative of a performance drop associated with a communication service provided by the node;

comparing the incident indication to a prior incident indication having a drop throughput associated with the drop throughput of the incident indication, the prior incident indication also having an indication that a node reset failed to improve a performance drop of another node; and based on comparing the incident indication to the prior incident indication, providing a recommendation.

17. The one or more non-transitory computer storage media of claim 16, the operations further comprising receiving a resolution indication based on providing the recommendation, the resolution indication indicating that the performance drop has been corrected based on the recommendation, and wherein the recommendation includes an average amount of time for completing the recommendation, the average amount of time based on prior resolution indications for prior incident indications.

18. The one or more non-transitory computer storage media of claim 16, wherein the recommendation corresponds to hardware and software of the node corresponding to the performance drop.

19. The one or more non-transitory computer storage media of claim 16, wherein the drop throughput of the incident indication corresponds to a total data transfer through the node that is below a threshold for a period of time.

20. The one or more non-transitory computer storage media of claim 16, wherein the drop throughput of the incident indication and the drop throughput of the prior incident indication are identified based on applying machine learning.

* * * * *